US012711393B2

(12) United States Patent
Wu et al.

(10) Patent No.: US 12,711,393 B2
(45) Date of Patent: Aug. 18, 2026

(54) COLLABORATIVE TRAINING WITH COMPRESSED TRANSMISSIONS

(71) Applicant: Rakuten Mobile, Inc., Tokyo (JP)

(72) Inventors: Di Wu, St Andrews (GB); Blesson Varghese, St Andrews (GB); Philip Rodgers, London (GB); Rehmat Ullah, St Andrews (GB); Peter Kilpatrick, Belfast (GB); Ivor Spence, Belfast (GB)

(73) Assignee: RAKUTEN MOBILE, INC., Tokyo (JP)

( * ) Notice: Subject to any disclaimer, the term of this patent is extended or adjusted under 35 U.S.C. 154(b) by 761 days.

(21) Appl. No.: 18/028,765

(22) PCT Filed: Dec. 12, 2022

(86) PCT No.: PCT/US2022/052496
§ 371 (c)(1),
(2) Date: Mar. 28, 2023

(87) PCT Pub. No.: WO2024/129052
PCT Pub. Date: Jun. 20, 2024

(65) Prior Publication Data

US 2025/0077887 A1 Mar. 6, 2025

(51) Int. Cl.
*G06N 3/098* (2023.01)
*G06N 3/0455* (2023.01)

(52) U.S. Cl.
CPC .......... *G06N 3/098* (2023.01); *G06N 3/0455* (2023.01)

(58) Field of Classification Search
CPC ............................ G06N 3/098; G06N 3/0455
See application file for complete search history.

(56) References Cited

U.S. PATENT DOCUMENTS

| | | | | |
|---|---|---|---|---|
| 10,068,557 | B1 * | 9/2018 | Engel | G06N 3/045 |
| 11,210,586 | B1 * | 12/2021 | Duong | G06N 3/0464 |
| 11,308,385 | B2 * | 4/2022 | Abadi | G06N 3/094 |
| 11,392,829 | B1 * | 7/2022 | Pool | G06N 3/08 |
| 11,887,346 | B2 * | 1/2024 | Poddar | G06V 10/7715 |
| 12,045,340 | B2 * | 7/2024 | Teranishi | G06N 3/08 |
| 2019/0311242 | A1 * | 10/2019 | Chen | G06N 3/063 |
| 2020/0013176 | A1 * | 1/2020 | Kang | G06T 7/593 |
| 2020/0401884 | A1 * | 12/2020 | Guo | G06N 3/08 |
| 2022/0019875 | A1 * | 1/2022 | Fishel | G06N 3/045 |

(Continued)

*Primary Examiner* — David E Choi
(74) *Attorney, Agent, or Firm* — HAUPTMAN HAM, LLP

(57) ABSTRACT

Collaborative training with compressed transmissions is performed by partitioning a plurality of layers of a neural network model into a device partition and a server partition, combining a plurality of encoding layers of an auto-encoder neural network with the device partition, wherein a largest encoding layer among the plurality of encoding layers is adjacent a layer of the device partition bordering the server partition, combining a plurality of decoding layers of the auto-encoder neural network with the server partition, wherein a largest decoding layer among the plurality of decoding layers is adjacent a layer of the server partition bordering the device partition, transmitting, to a computation device, the device partition combined with the plurality of encoding layers, and training, collaboratively with the computation device through a network, the neural network model.

17 Claims, 11 Drawing Sheets

(56) References Cited

U.S. PATENT DOCUMENTS

| | | | | |
|---|---|---|---|---|
| 2022/0121960 | A1* | 4/2022 | Reeb | G06N 3/045 |
| 2022/0245459 | A1* | 8/2022 | Laskaridis | G06N 3/098 |
| 2023/0038394 | A1* | 2/2023 | Lim | G06N 3/082 |
| 2023/0164336 | A1* | 5/2023 | Cricri | H04N 19/46<br>375/240.08 |
| 2023/0269387 | A1* | 8/2023 | Cricrì | G06N 3/0985<br>375/240.03 |
| 2023/0298219 | A1* | 9/2023 | Galpin | H04N 19/61<br>382/232 |
| 2023/0412806 | A1* | 12/2023 | Yang | H04N 19/124 |
| 2024/0086677 | A1* | 3/2024 | Burr | G06N 5/04 |
| 2024/0107079 | A1* | 3/2024 | Toderici | G06N 3/0475 |
| 2024/0249121 | A1* | 7/2024 | Ashfaq | G06N 3/045 |
| 2024/0303464 | A1* | 9/2024 | Du | G06N 3/04 |
| 2025/0077887 | A1* | 3/2025 | Wu | G06N 3/0455 |
| 2025/0080320 | A1* | 3/2025 | Ku | G06N 3/084 |
| 2025/0292764 | A1* | 9/2025 | Li | G06N 3/088 |

* cited by examiner

COLLABORATIVE TRAINING WITH COMPRESSED TRANSMISSIONS

RELATED APPLICATIONS

The present application is a National Phase of International Application No. PCT/US2022/052496 filed Dec. 12, 2022.

BACKGROUND

Technical Field

This description relates to collaborative training with compressed transmissions.

Background

Collaborative machine learning (CML) techniques, such as federated learning, are used to collaboratively train neural network models using multiple computation devices, such as end-user devices, and a server. CML techniques preserve the privacy of end-users because it does not require user data to be transferred to the server. Instead, local models are trained and shared with the server.

SUMMARY

According to at least some embodiments of the subject disclosure, collaborative training with compressed transmissions is performed by partitioning a plurality of layers of a neural network model into a device partition and a server partition, combining a plurality of encoding layers of an auto-encoder neural network with the device partition, wherein a largest encoding layer among the plurality of encoding layers is adjacent a layer of the device partition bordering the server partition, combining a plurality of decoding layers of the auto-encoder neural network with the server partition, wherein a largest decoding layer among the plurality of decoding layers is adjacent a layer of the server partition bordering the device partition, transmitting, to a computation device, the device partition combined with the plurality of encoding layers, and training, collaboratively with the computation device through a network, the neural network model.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
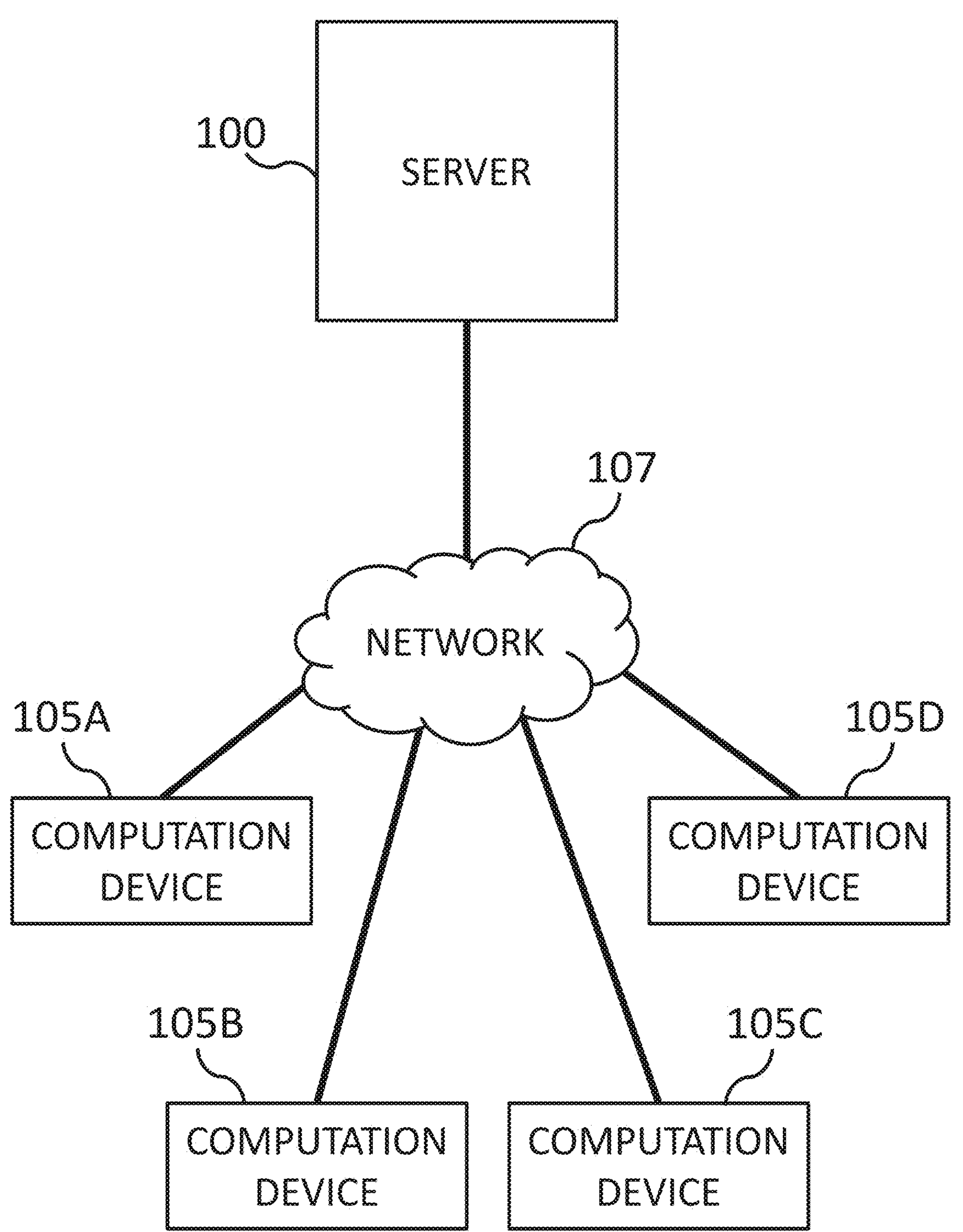
FIG. 1 is a schematic diagram of a system for collaborative training with compressed transmissions, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Internet-of-Things (IoT) devices are used for Federated Learning (FL), but have limited computational resources to independently perform training. Offloading is adopted as a mechanism to accelerate training by moving the computational workload of devices to an edge server. However, this creates new communication overhead that have been demonstrated to be a bottleneck in some offloading-based FL systems. At least some embodiments of the subject disclosure address communication inefficiency directly by developing a communication efficient offloading-based FL framework for IoT devices. At least some embodiments of the subject disclosure reduce the communication overhead introduced by offloading by adjusting the transmission frequency and size of transferred data in a disciplined manner. At least some embodiments of the subject disclosure incorporate techniques that employ: (i) transfer learning on the devices to eliminate gradient transmission, (ii) buffer replay to reduce activation transmission frequency, and (iii) an autoencoder-based compression and quantization techniques to decrease the size of activations. At least some embodiments of the subject disclosure reduce the offloading-based communication cost. At least some embodiments of the subject disclosure reduce the communication cost by up to 202×, improve the overall training time by up to 12×, and conserve up to 84% energy when compared to state-of-the-art methods, while sacrificing no more than 3% accuracy.

In at least some embodiments, each computation device among K computation devices, denoted as $$\{k\}_{k=1}^{K},$$

has a dataset $D_k$. In at least some embodiments, the entire dataset of all devices then can be denoted as $$D: \{D_k\}_{k=1}^{K}.$$

In at least some embodiments, the number of samples in $D_k$ is denoted as $|D_k|$, and the total number of samples is $|D|$. In at least some embodiments, W represents the parameters of the global neural network model on the cloud server, which is partitioned into the device partition $W_C$ and server partition $W_S$, where $W_{C,k}$ and $W_{S,k}$ are the device partition and server partition of the $k^{th}$ computation device, respectively. In at least some embodiments, the superscript t is used to represent model parameters of the iteration t, $|\bullet|_{comp}$ is the computation workload (either the forward or backward pass) of a given model and $|\bullet|_{comm}$ is the communication workload of a given model or an intermediate feature map, such as an activation.

At least some embodiments of the subject disclosure include a communication efficient offloading-based FL framework, which reduces the communication overhead between computation devices, such as IoT devices, and the server in an offloading-based FL system. To reduce communication overhead introduced by offloading, the offloading-based training between computation devices and the server is adjusted using a frequency switch and/or a data compressor, in at least some embodiments. In at least some embodiments of the subject disclosure, the device partition $W_C$ is initialized with pre-trained weights, which are fixed during collaborative training. At least some embodiments (i) reduce the gradient computation (grad(A)) on computation devices; (ii) reduce gradient communication from the server to the computation devices; (iii) stabilize output of $W_C$, thereby providing the opportunity for compressing the activations of the device partition A. In at least some embodiments, the frequency of transmission for activations A is periodically reduced by using a buffer replay mechanism on the server to train server partition $W_S$ instead of collecting activations A from the computation devices. In at least some embodiments, the compression of activations A is facilitated by a data compressor module, using an auto-encoder and quantization, which further reduces the communication overhead.

FIG. 1 is a schematic diagram of a system for collaborative training with compressed transmissions, according to at least some embodiments of the subject disclosure. The system includes a server 100, a plurality of computation devices 105A, 105B, 105C, and 105D, and a network 107.

Server 100 is computation device capable of performing calculations to train a neural network or other machine learning function. In at least some embodiments, server 100 includes a non-transitory computer-readable medium including instructions executable by a processor to cause the processor to perform training with compressed transmissions in collaboration with computation devices 105A, 105B, 105C, and 105D. In at least some embodiments, server 100 is a single server, a plurality of servers, a portion of a server, a virtual instance of cloud computing, etc. In at least some embodiments where server 100 is a plurality of servers or a plurality of virtual instances of cloud computing, server 100 includes a central server working with edge servers, each edge server having a logical location that is closer to the respective computation device among computation devices 105A, 105B, 105C, and 105D with which the edge server is in communication.

Computation devices 105A, 105B, 105C, and 105D are devices capable of performing calculations to train a neural network or other machine learning function. In at least some embodiments, computation devices 105A, 105B, 105C, and 105D each include a non-transitory computer-readable medium including instructions executable by a processor to cause the processor to perform training with compressed transmissions in collaboration with server 100. In at least some embodiments, computation devices 105A, 105B, 105C, and 105D are heterogeneous, meaning the devices have varying computation resources, such as processing power, memory, etc. In at least some embodiments, computation devices 105A, 105B, 105C, and 105D include devices having limited computation resources, such as smart watches, fitness trackers, Internet-of-Things (IoT) devices, etc., and/or devices having computational resources for a broader range of capabilities, such as smart phones, tablets, personal computers, etc. In at least some embodiments, computation devices 105A, 105B, 105C, and 105D receive private information, either by detecting it directly, such as through onboard microphones, cameras, etc., or by receiving data through electronic communication with another device, and use the private information as training data. In at least some embodiments, the training data is not private information or is a mixture of private and non-private information.

Computation devices 105A, 105B, 105C, and 105D are in communication with server 100 through network 107. In at least some embodiments, network 102 is configured to relay communication among server 100 and computation devices 105A, 105B, 105C, and 105D. In at least some embodiments, network 107 is a local area network (LAN), a wide area network (WAN), such as the internet, a radio access network (RAN), or any combination. In at least some embodiments, network 107 is a packet-switched network operating according to IPv4, IPv6 or other network protocol.

At least some embodiments of the subject disclosure include modules that reduce communication cost due to offloading. In at least some embodiments, a data compressor focuses on compressing the data using auto-encoder-based compression and quantization. In at least some embodiments, the compressed data is then transferred between computation devices, such as IoT devices, and edge servers in communication with a central server.

In at least some embodiments, the auto-encoder-based neural architecture (also referred to as the BOTTLENET architecture) is used as a dimension reduction technique that generates a dense representation of input data. In at least some embodiments, computation devices incorporate an auto-encoder to reduce the number of channels, width, and height of activation outputs of the device partition. In at least some embodiments, the auto-encoder is partitioned as an encoder and decoder. In at least some embodiments, the encoder acts as a compressor while the decoder on the server reconstructs the corresponding output of the encoder to the original size of activations. In at least some embodiments, the auto-encoder is only used during collaborative training, and is removed after collaborative training, and therefore does not permanently change the original architecture of the neural network model. In at least some embodiments, lost model performance is recovered by fine-tuning the neural network model without the auto-encoder for a few rounds of additional training, either collaborative, or on one of the computation device and the server.

Figure 2:
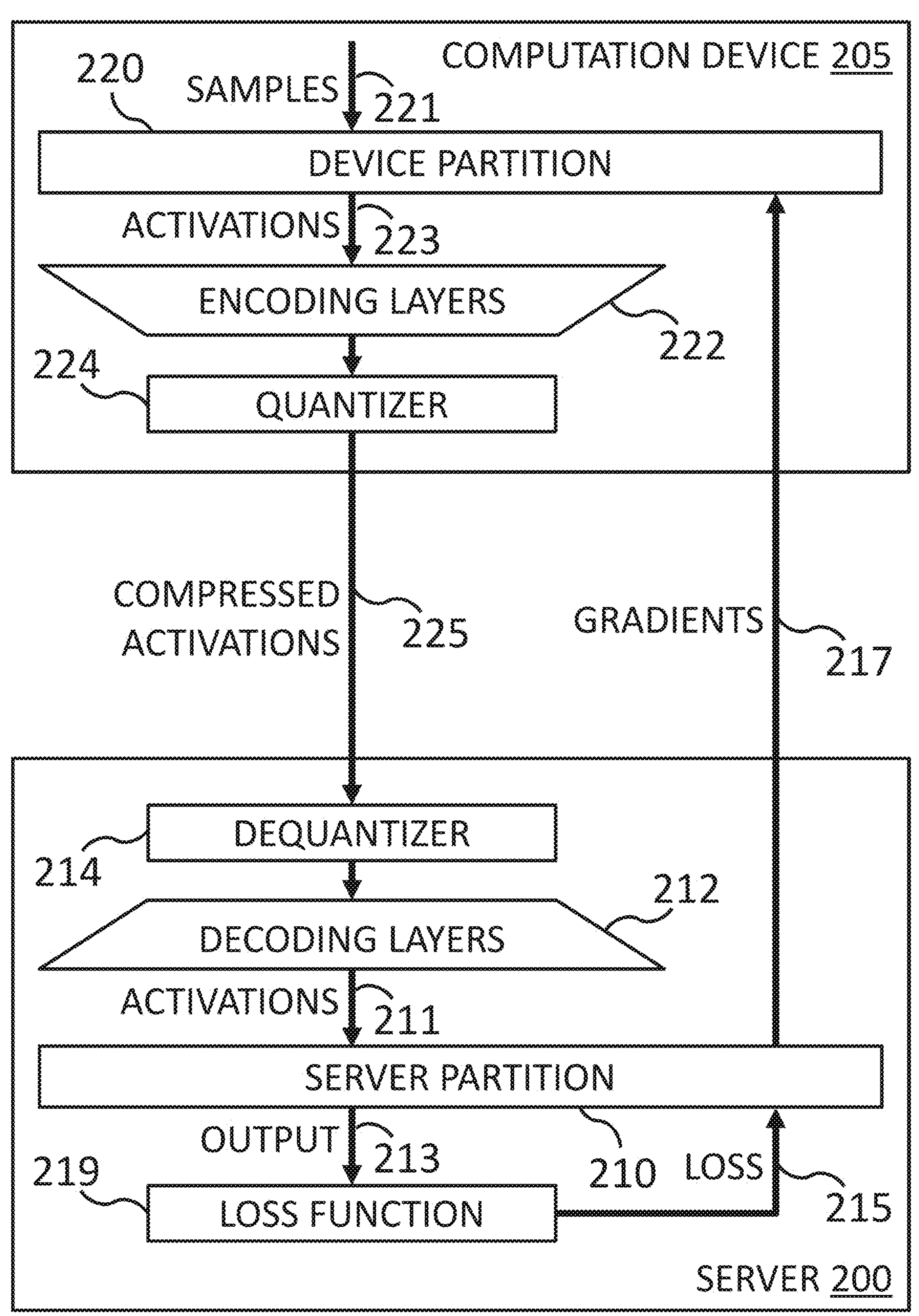
FIG. 2 is a schematic diagram of a server and a computation device for collaborative training with compressed transmissions, according to at least some embodiments of the subject disclosure.

FIG. 2 is a schematic diagram of a server 200 and a computation device 205 for collaborative training with compressed transmissions, according to at least some embodiments of the subject disclosure. Computation device 205 includes a device partition 220, a plurality of encoding layers 222, and a quantizer 224. Server 200 includes a dequantizer 214, a plurality of decoding layers 212, a server partition 210, and a loss function 219.

In at least some embodiments, computation device 205 is configured to detect or otherwise receive data samples 221 for input to device partition 220, which produces activations 223 in response to input of data samples. In at least some embodiments, computation device 205 is configured to compress activations 223 using the plurality of encoding layers 222. In at least some embodiments, computation device is configured to further compress activations 223 by utilizing quantizer 224 to adjust the bit-width of encoded activations produced by the plurality of encoding layers 222. In at least some embodiments, quantizer 224 is configured to change the bit-width of the encoded activations from 32-bit to 8-bit. In at least some embodiments, computation device 205 is configured to transmit compressed activations 225 to server 200. In at least some embodiments, computation device 205 is configured to receive gradients 217 from server 200, and utilize gradients 217 to adjust gradients of device partition 220, and then update weight values and other parameter values according to the adjusted gradient values.

In at least some embodiments, server 200 is configured to receive compressed activations 225 from computation device 205. In at least some embodiments, server 200 is configured to decompress compressed activations 225 by utilizing dequantizer 214 to adjust the bit-width. In at least some embodiments, dequantizer 214 is configured to change the bit-width of the encoded activations from 8-bit to 32-bit. In at least some embodiments, server 200 is configured to further decompress compressed activations 225 using the plurality of decoding layers 212 to reconstruct activations 211. In at least some embodiments, server 200 is configured to apply server partition 210 to activations 211 to produce output 213. In at least some embodiments, server 200 is configured to apply loss function 219 to output 213 to compute loss 215. In at least some embodiments, server 200 is configured to adjust gradients of server partition 210 based on loss 215, and then update weight values and other parameter values according to the adjusted gradient values. In at least some embodiments, server 200 is configured to transmit gradients 217 to computation device 205.

In at least some embodiments, reconstructed activations 211 are slightly different from original activations 223, which will have an impact on the accuracy of the trained neural network model. In at least some embodiments, the auto-encoder has dimensions such that the input layer size matches the size of the border layer of device partition 220, and the output layer size matches the size of the border layer of server partition 210. In at least some embodiments, the size of encoding layers 222 reduces as the distance from device partition 220 increases, the smallest encoding layer being furthest from device partition 220. In at least some embodiments, the smallest encoding layer among the plurality of encoding layers 222 determines the compression level, and as the compression level increases, the accuracy potentially decreases. In at least some embodiments, as the number of encoding layers 222 increases, the accuracy potentially increases, but the computation time also increases. In at least some embodiments, as the bit-width to which the quantizer 224 adjusts and from which the dequantizer 214 adjusts increases, the accuracy potentially increases, but so does the size of the transmission of compressed activations 225. In at least some embodiments, encoding layers 222, quantizer 224, dequantizer 214, and decoding layers 212 are configured to balance the trade-off between the size of the transmission of compressed activations 225 and the impact on accuracy.

Figure 3:
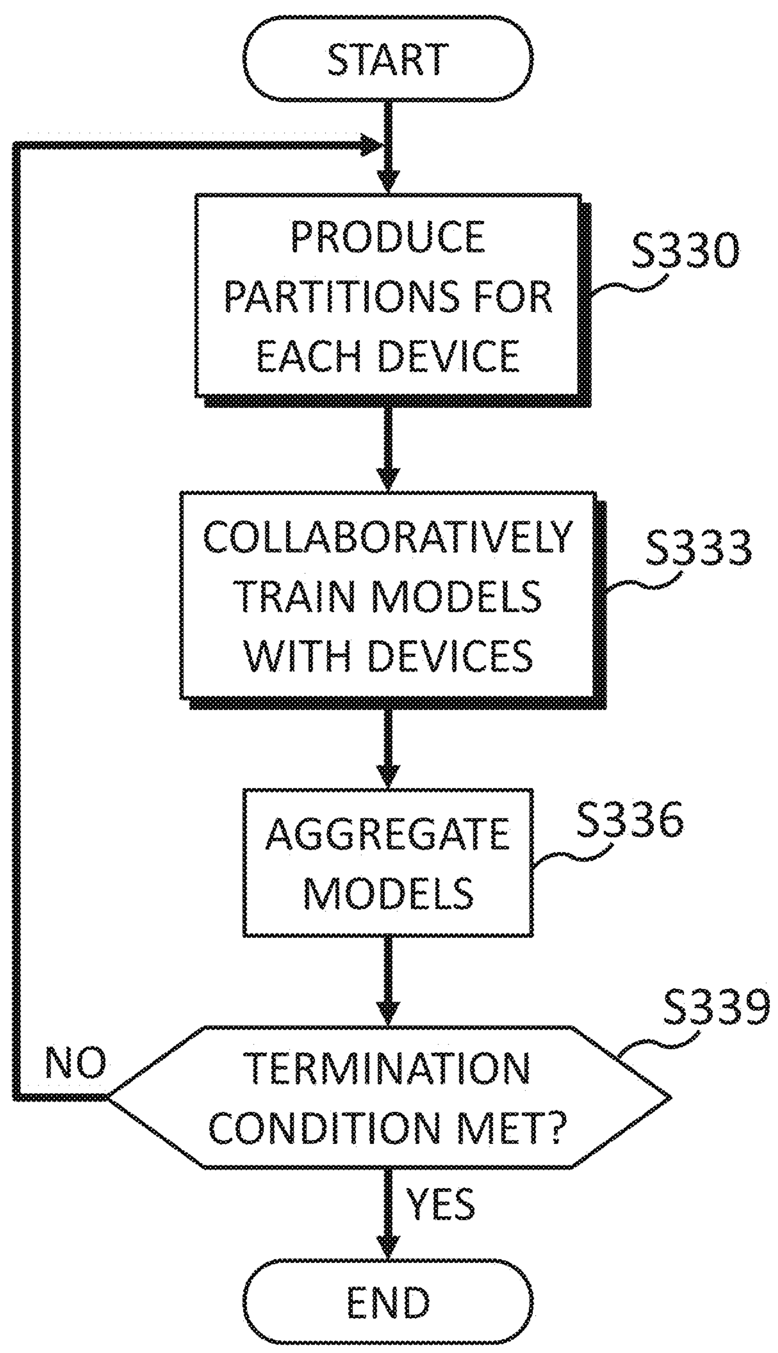
FIG. 3 is an operational flow for collaborative training with compressed transmissions, according to at least some embodiments of the subject disclosure.

FIG. 3 is an operational flow for collaborative training with compressed transmissions, according to at least some embodiments of the subject disclosure. The operational flow provides a method of collaborative training with compressed transmissions. In at least some embodiments, the method is performed by a controller of a server including sections for performing certain operations, such as the controller and server shown in FIG. 11, which will be explained hereinafter.

At S330, a partitioning section produces partitions for each computation device. In at least some embodiments, the partitioning section partitions a plurality of layers of a neural network model W for each computation device in a location based on characteristics of the respective computation device. In at least some embodiments, the partitioning section varies the number of layers in a device partition $W_C$ and a server partition $W_S$ based on a duration of time for the respective computation device to process and transmit data. In at least some embodiments, the partitioning section attaches decoding layers $W_D$ of an auto-encoder to a server partition, and encoding layers $W_E$ of an auto-encoder to a device partition. In at least some embodiments, the training section performs, for each computation device, the operational flow shown in FIG. 4, which will be explained hereinafter.

At S333, a training section collaboratively trains models with the computation devices. In at least some embodiments, the training section trains each instance of the neural network model collaboratively with a corresponding computation device among a plurality of computation devices. In at least some embodiments, the training section continuously updates the parameters, such as weights, of each instance of the neural network model for a number of rounds or until the parameters are satisfactory. In at least some embodiments, the training section performs, for each computation device, the operational flow shown in FIG. 6, which will be explained hereinafter.

At S336, an aggregating section aggregates the models collaboratively trained with the computation devices. In at least some embodiments, the aggregating section aggregates the updated parameters of neural network model instances received from the plurality of computation devices to generate an updated neural network model. In at least some embodiments, the aggregating section averages the gradient values across the neural network model instances, and calculates weight values of a global neural network model accordingly. In at least some embodiments, the aggregating section averages the weight values across the neural network model instances. In at least some embodiments, a global neural network model W is obtained by aggregating neural network model instances $W_k$ using the following algorithm:

$$W = \sum_{k=1}^{K} \frac{|D^k|}{|D|} W_{S,k} \qquad \text{EQ. 1}$$

where $D^k$ is the local dataset on device k and |•| is the function to obtain the size of the given dataset. In at least some embodiments, an epoch of collaborative training is complete when the aggregating section generates the updated global neural network model.

At S339, the controller or a section thereof determines whether a termination condition has been met. In at least some embodiments, the termination condition is met when the neural network model converges. In at least some embodiments, the termination condition is met after a predetermined number of epochs of collaborative training have been performed. In at least some embodiments, the termination condition is met when a time limit is exceeded. If the controller determines that the termination condition has not been met, then the operational flow returns to partition producing at S330. If the controller determines that the termination condition has been met, then the operational flow ends.

Figure 4:
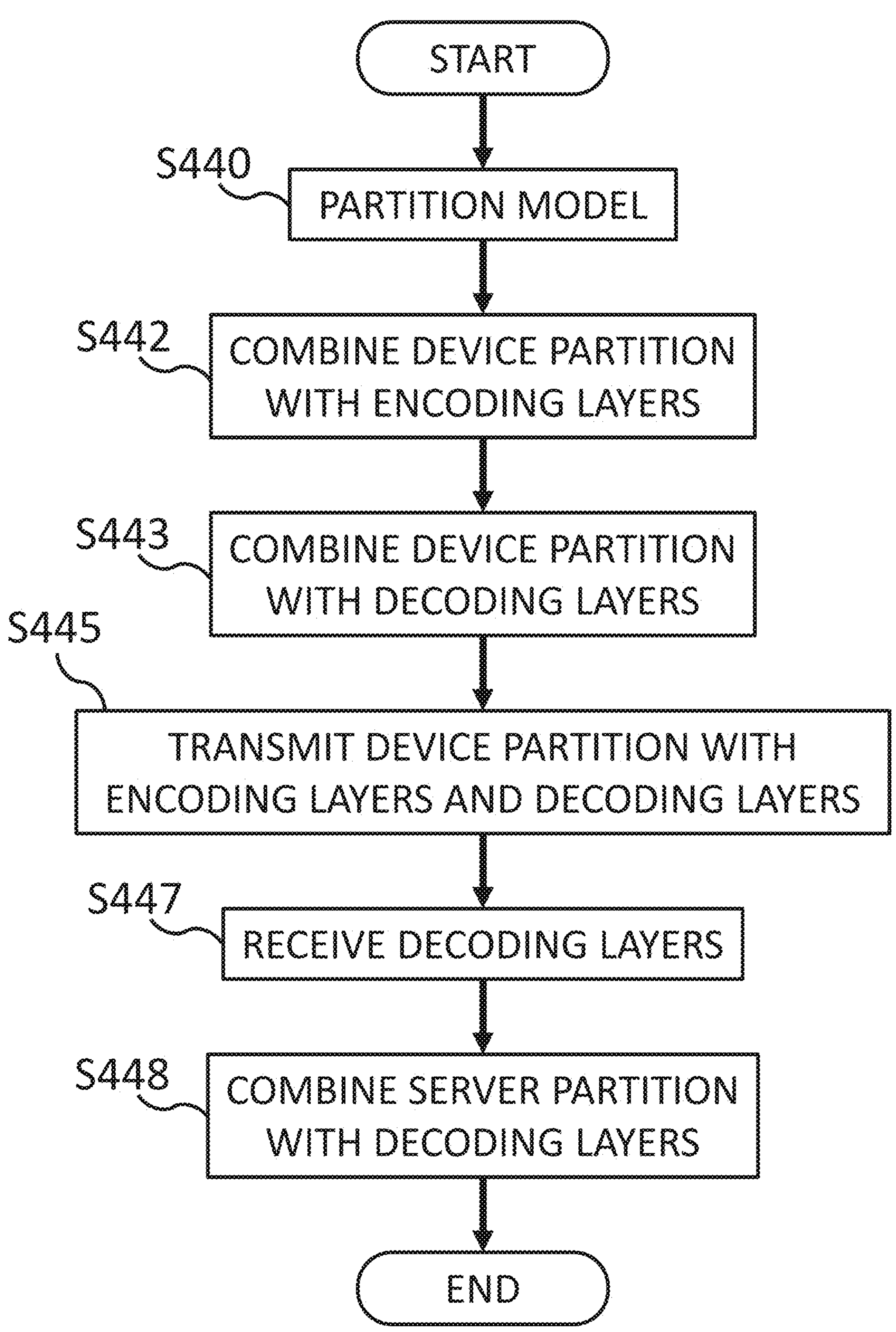
FIG. 4 is an operational flow for producing partitions, according to at least some embodiments of the subject disclosure.

FIG. 4 is an operational flow for producing partitions, according to at least some embodiments of the subject disclosure. The operational flow provides a method of producing partitions by a server. In at least some embodiments, the operational flow is performed for each computation device among a plurality of computation devices. In at least some embodiments, the operational flow is performed in parallel for each computation device among the plurality of computation devices. In at least some embodiments, the method is performed by a partitioning section of a server, such as the server shown in FIG. 11, which will be explained hereinafter.

At S440, the partitioning section or a sub-section thereof partitions a neural network model. In at least some embodiments, the partitioning section partitions a plurality of layers of a neural network model into a device partition and a server partition. In at least some embodiments, the partitioning section partitions a plurality of layers of a neural network model W for the computation device in a location based on characteristics of the computation device. In at least some embodiments, the partitioning section varies the number of layers in a device partition $W_C$ and a server partition $W_S$ based on a duration of time for the computation device to process and transmit data.

At S442, the partitioning section or a sub-section thereof combines the device partition with encoding layers. In at least some embodiments, the partitioning section combines a plurality of encoding layers of an auto-encoder neural network with the device partition. In at least some embodiments, a largest encoding layer among the plurality of encoding layers is adjacent a layer of the device partition bordering the server partition.

At S443, the partitioning section or a sub-section thereof further combines the device partition with decoding layers. In at least some embodiments, the partitioning section combines the plurality of decoding layers of the auto-encoder neural network with the device partition. In at least some embodiments, a smallest decoding layer among the plurality of decoding layers is adjacent a smallest layer among the plurality of encoding layers. In at least some embodiments, the operations at S442 and S443 can be thought of together as combining the device partition with the auto-encoder.

At S445, the partitioning section or a sub-section thereof transmits the device partition together with the encoding layers and the decoding layers. In at least some embodiments, the partitioning section transmits, to a computation device, the device partition combined with the plurality of encoding layers and the plurality of decoding layers. In at least some embodiments, the partitioning section transmits the device partition, the encoding layers, and the decoding layers separately, instead of performing the operations at S442 and S443.

At S447, the partitioning section or a sub-section thereof receives decoding layers. In at least some embodiments, the partitioning section receives, from the computation device, the plurality of decoding layers before combining the plurality of decoding layers with the server partition. In at least some embodiments, the partitioning section receives trained decoding layers from the computation device. In at least some embodiments, the partitioning section receives decoding layers that have been trained by the computation device along with the encoding layers.

At S448, the partitioning section or a sub-section thereof combines the server partition with the decoding layers. In at least some embodiments, the partitioning section combines a plurality of decoding layers of the auto-encoder neural network with the server partition. In at least some embodiments, a largest decoding layer among the plurality of decoding layers is adjacent a layer of the server partition bordering the device partition.

Figure 5:
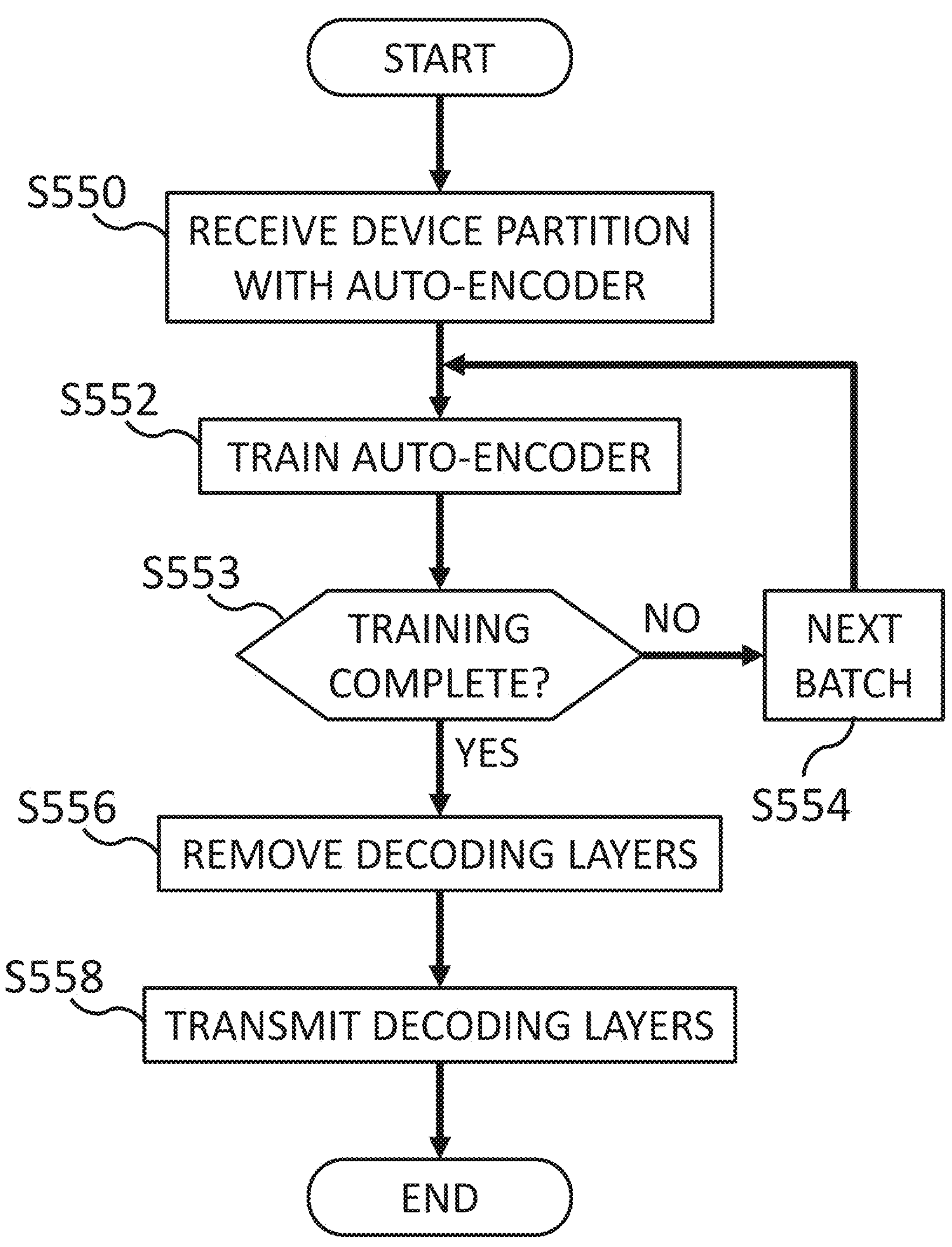
FIG. 5 is an operational flow for training an auto-encoder with a computation device, according to at least some embodiments of the subject disclosure.

FIG. 5 is an operational flow for training an auto-encoder with a computation device, according to at least some embodiments of the subject disclosure. The operational flow provides a method of training an auto-encoder by one computation device. In at least some embodiments, the operational flow is performed by each computation device among a plurality of computation devices. In at least some embodiments, the operational flow is performed in parallel by each computation device among the plurality of computation devices.

At S550, the computation device receives a device partition with an auto-encoder. In at least some embodiments, the computation device receives, from the server, the device partition combined with the plurality of encoding layers and a plurality of decoding layers of the auto-encoder neural network. In at least some embodiments, the computation device receives a device partition and the auto-encoder separately, and then combines the device partition with the encoding layers and decoding layers of the auto-encoder. In at least some embodiments, the computation device receives, from a server, a device partition of a neural network model combined with a plurality of encoding layers of an auto-encoder neural network, the neural network model including a plurality of layers partitioned into the device partition and a server partition, wherein a largest encoding layer among the plurality of encoding layers is adjacent a layer of the device partition bordering the server partition.

At S552, the computation device trains the auto-encoder. In at least some embodiments, the computation device trains the auto-encoder neural network before training the neural network model. In at least some embodiments, the computation device freezes the weights of the device partition while training the auto-encoder. In at least some embodiments, the computation device applies the device partition to input data to obtain activations, and applies the auto-encoder to the activations, then adjusts the parameters, such as weights, of the auto-encoder based on the difference between the activation input to the auto-encoder and the output of the auto-encoder.

In at least some embodiments, each computation device trains an auto-encoder used for data compression during collaborative training. In at least some embodiments, the training of each auto-encoder is independently conducted on each computation device. In at least some embodiments, the following training steps are performed on each computation device. First, the computation device freezes the weights of the device partition $W_C$. Then, the computation device generates activations using the device partition for training the encoder $W_{E,k}$ and the decoder $W_{D,k}$. In at least some embodiments, the computation device performs the training in an unsupervised manner where a typical mean square error loss is adopted to train the encoder $W_{E,k}$ and the decoder $W_{D,k}$ to copy the output of the device partition $W_C$ to the output of the decoder $W_{D,k}$ for each batch. In at least some embodiments, the additional training workload on each computation device of the auto-encoder is relatively minor compared to the training workload of the original neural network model W since $W_C$ is smaller than the entire model W.

At S553, the computation device determines whether training is complete. In at least some embodiments, the auto-encoder is trained for a predetermined number of batches. In at least some embodiments, the auto-encoder is trained until the loss converges. In at least some embodiments, the auto-encoder is trained for a predetermined duration of time. If the computation device determines that training is not complete, then the operational flow returns to auto-encoder training at S552 with the next batch (S554). If the computation device determines that training is complete, then the operational flow proceeds to decoding layer removal at S556.

At S556, the computation device removes the decoding layers. In at least some embodiments, the computation device removes the plurality of decoding layers from the device partition and the plurality of encoding layers.

At S558, the computation device transmits the decoding layers. In at least some embodiments, the computation device transmits, to the server, the plurality of decoding layers. In at least some embodiments, the computation device transmits the trained decoder $W_{D,k}$* to the server for subsequent collaborative training.

In at least some embodiments, the auto-encoder is collaboratively trained by the computation device and the server. In at least some such embodiments, the server transmits, to a computation device, the device partition combined with the plurality of encoding layers. In at least some such embodiments, the server trains, collaboratively with the computation device through the network, the auto-encoder neural network before training the neural network model. In at least some such embodiments, the computation device trains, collaboratively with the server through the network, the auto-encoder neural network before training the neural network model.

Figure 6:
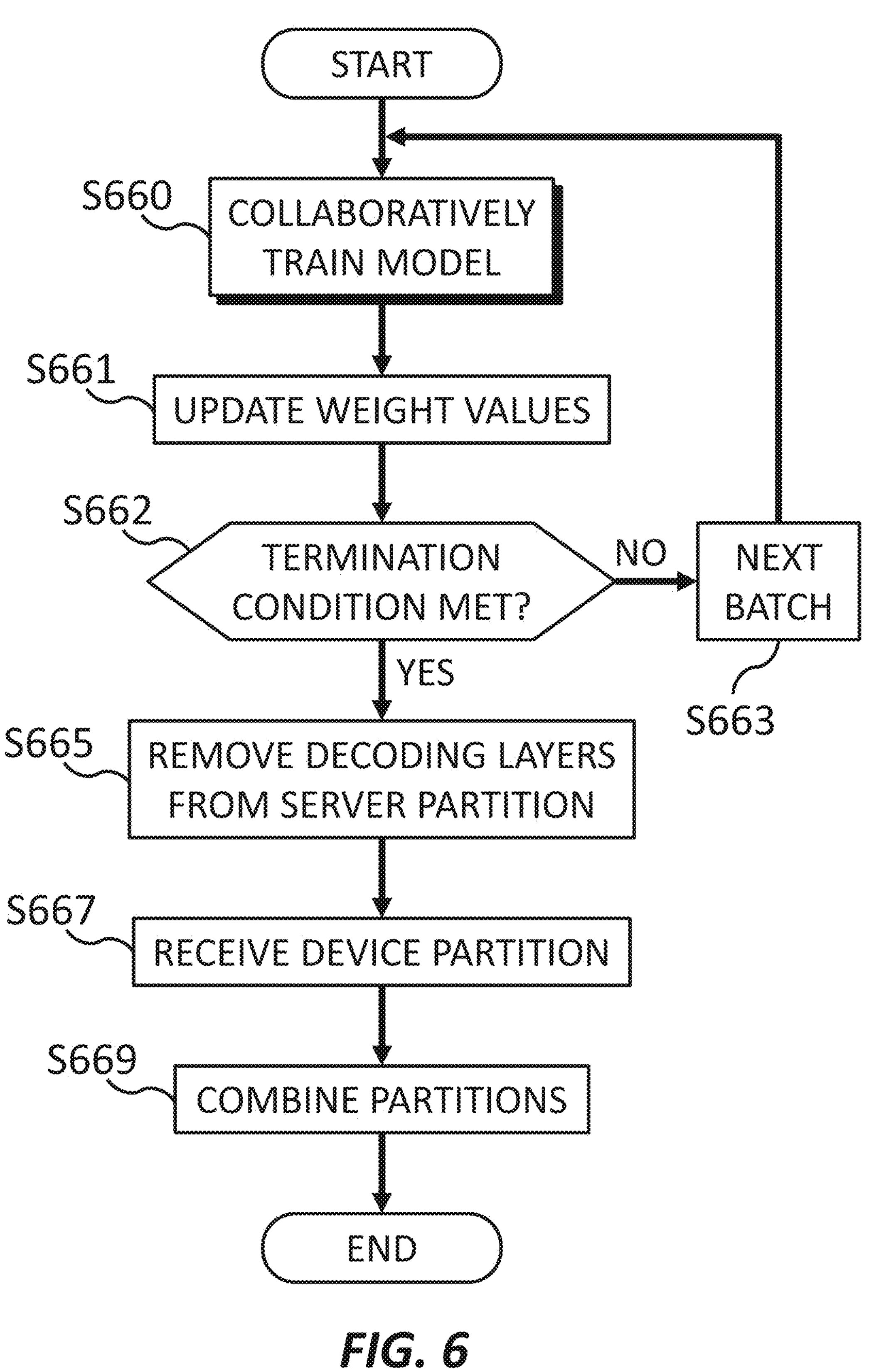
FIG. 6 is an operational flow for training in collaboration with a computation device, according to at least some embodiments of the subject disclosure.

FIG. 6 is an operational flow for training in collaboration with a computation device, according to at least some embodiments of the subject disclosure. The operational flow provides a method of training in collaboration with one computation device for one epoch. In at least some embodiments, the operational flow is performed for each computation device among a plurality of computation devices. In at least some embodiments, the operational flow is performed in parallel for each computation device among the plurality of computation devices. In at least some embodiments, the method is performed by a training section of a server, such as the server shown in FIG. 11, which will be explained hereinafter.

At S660, the training section or a sub-section thereof collaboratively trains the model using a batch of data samples. In at least some embodiments, the training section trains, collaboratively with the computation device through a network, the neural network model. In at least some embodiments, the training section trains server partition $W_{S,k}$ while computation device k trains device partition $W_{C,k}$. In at least some embodiments, the training section performs the operational flow shown in FIG. 7, which will be explained hereinafter.

At S661, the training section or a sub-section thereof updates weight values. In at least some embodiments, the training section updates weight values of the server partition based on the set of gradient vectors for each layer of the server partition. In at least some embodiments, the training section updates the parameters of server partition $W_{S,k}$ at the end of the training round. In at least some embodiments, as iterations of S660 and S661 proceed, the training section performs a plurality of iterations of the training to produce an updated server partition.

At S662, the training section or a sub-section thereof determines whether a termination condition has been met. In at least some embodiments, the training section does not stop training server partition $W_{S,k}$ until a "stop epoch" signal is received from computation device k. If the training section determines that the termination condition has not been met, then the operational flow returns to collaborative training at S660 for collaborative training using the next batch (S663). If the profiling section determines that the termination condition has been met, then the operational flow proceeds to decoding layer removal at S665.

At S665, the training section or a sub-section thereof removes the decoding layers from the server partition. In at least some embodiments, the training section removes the plurality of decoding layers of the auto-encoder from the layers of the server partition. In at least some embodiments, the training section discards the plurality of decoding layers. In at least some embodiments in which the server includes a central server in communication with edge servers, each edge server transmits the corresponding server partition $W_{S,k}$ to the central server for aggregation.

At S667, the training section or a sub-section thereof receives the device partition. In at least some embodiments, the training section receives the device partition from the computation device. In at least some embodiments, the training section receives updated device partition $$W_{C,k}^*$$

from computation device k.

At S669, the training section or a sub-section thereof combines partitions. In at least some embodiments, the training section combines the device partition with the server partition to obtain an updated neural network model. In at least some embodiments, the training section combines updated device partition $$W_{C,k}^*$$

from computation device k with updated server partition $$W_{S,k}^{*}$$

to produce an updated model $$W_{k}^{*}.$$

Figure 7:
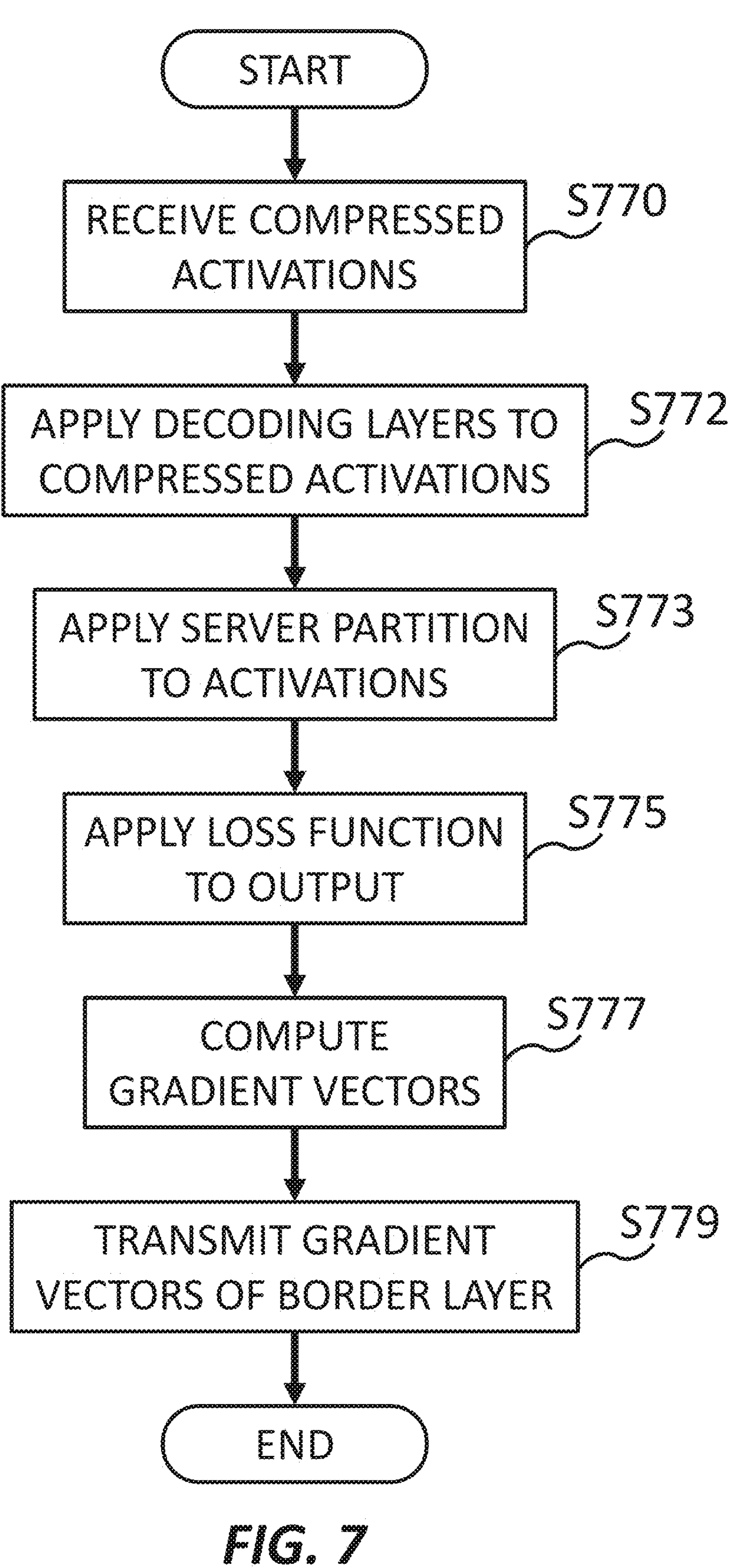
FIG. 7 is an operational flow for a batch of training in collaboration with a computation device, according to at least some embodiments of the subject disclosure.

FIG. 7 is an operational flow for a batch of training in collaboration with a computation device, according to at least some embodiments of the subject disclosure. The operational flow provides a method of training a neural network model using a batch of data samples in collaboration with one computation device. In at least some embodiments, the operational flow is performed for each computation device among a plurality of computation devices. In at least some embodiments, the operational flow is performed in parallel for each computation device among the plurality of computation devices. In at least some embodiments, the method is performed by a training section of a server, such as the server shown in FIG. 11, which will be explained hereinafter.

At S770, the training section or a sub-section thereof receives compressed activations. In at least some embodiments, the training section receives, from the computation device, a set of compressed activations output from the plurality of encoding layers. In at least some embodiments, during the receiving, the training section receives a set of labels from the computation device.

At S772, the training section or a sub-section thereof applies the decoding layers to the compressed activations. In at least some embodiments, the training section applies the plurality of decoding layers to the set of compressed activations to obtain a set of activations. In at least some embodiments, the training section also dequantizes the set of compressed activations by increasing the bit-width of each compressed activation among the set of compressed activations. In at least some embodiments, the training section dequantizes the compressed activations $$z_{k}^{t}$$

by the inverse function $Q^{-1}(\bullet)$ from 8 bits to 32 bits. The reconstructed activations $$\hat{A}_{k}^{t}$$

are decoded by the decoding layers $$W_{D,k}^{*}.$$

At S773, the training section or a sub-section thereof applies the server partition to the activations. In at least some embodiments, the training section applies the server partition to the set of activations to obtain a set of output instances.

At S775, the training section or a sub-section thereof applies a loss function to the output of the server partition. In at least some embodiments, the training section applies a loss function relating activations to output instances to each output instance among the current set of output instances to obtain a set of loss values.

At S777, the training section or a sub-section thereof computes gradient vectors. In at least some embodiments, the training section computes a set of gradient vectors for each layer of the server partition, including a set of gradient vectors of a layer bordering the device partition, based on the set of loss values.

At S779, the training section or a sub-section thereof transmits gradient vectors of the border layer. In at least some embodiments, the training section transmits, to the computation device, the set of gradient vectors of the layer bordering the device partition.

Figure 8:
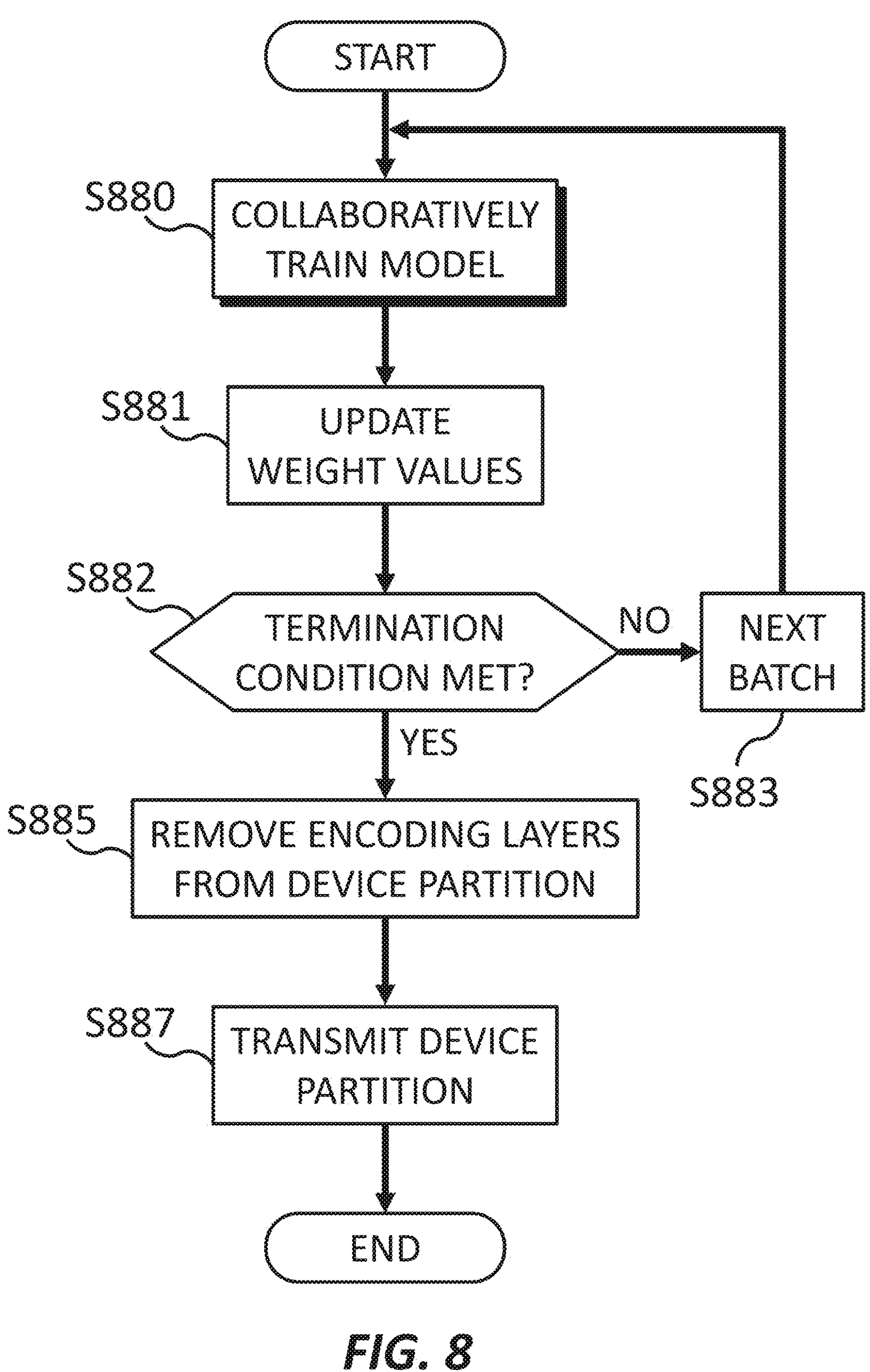
FIG. 8 is an operational flow for training in collaboration with a server, according to at least some embodiments of the subject disclosure.

FIG. 8 is an operational flow for training in collaboration with a server, according to at least some embodiments of the subject disclosure. The operational flow provides a method of training by one computation device in collaboration with the server for one epoch. In at least some embodiments, the operational flow is performed by each computation device among a plurality of computation devices. In at least some embodiments, the operational flow is performed in parallel by each computation device among the plurality of computation devices.

At S880, the computation device collaboratively trains the model using a batch of data samples. In at least some embodiments, the computation device trains, collaboratively with the server through a network, the neural network model. In at least some embodiments, computation device k trains device partition $W_{C,k}$ while the server trains server partition $W_{S,k}$. In at least some embodiments, the computation device performs the operational flow shown in FIG. 9, which will be explained hereinafter.

At S881, the computation device updates the weight values. In at least some embodiments, the computation device updates weight values of the device partition based on the set of gradient vectors for each layer of the device partition during the training. In at least some embodiments, computation device k updates the parameters of device partition $W_{C,k}$ at the end of the training round. In at least some embodiments, as iterations of S880 and S881 proceed, the computation device performs a plurality of iterations of the training to produce an updated device partition.

At S882, the computation device determines whether a termination condition has been met. In at least some embodiments, the termination condition is met when collaborative training has been performed using a predetermined number of batches. In at least some embodiments, the termination condition is met when collaborative training has been performed for a predetermined amount of time. If the computation device determines that the termination condition has not been met, then the operational flow returns to collaborative training at S880 for collaborative training using the next batch (S883). If the computation device determines that the termination condition has been met, then the operational flow proceeds to encoding layer removal at S885.

At S885, the computation device removes the encoding layers from the device partition. In at least some embodiments, the computation device removes the plurality of encoding layers from the device partition. In at least some embodiments, the computation device discards the plurality of encoding layers.

At S887, the computation device transmits the device partition. In at least some embodiments, the computation device transmits the device partition to the server. In at least some embodiments, computation device k transmits updated device partition $$W_{C,k}^{*}$$

to the server.

Figure 9:
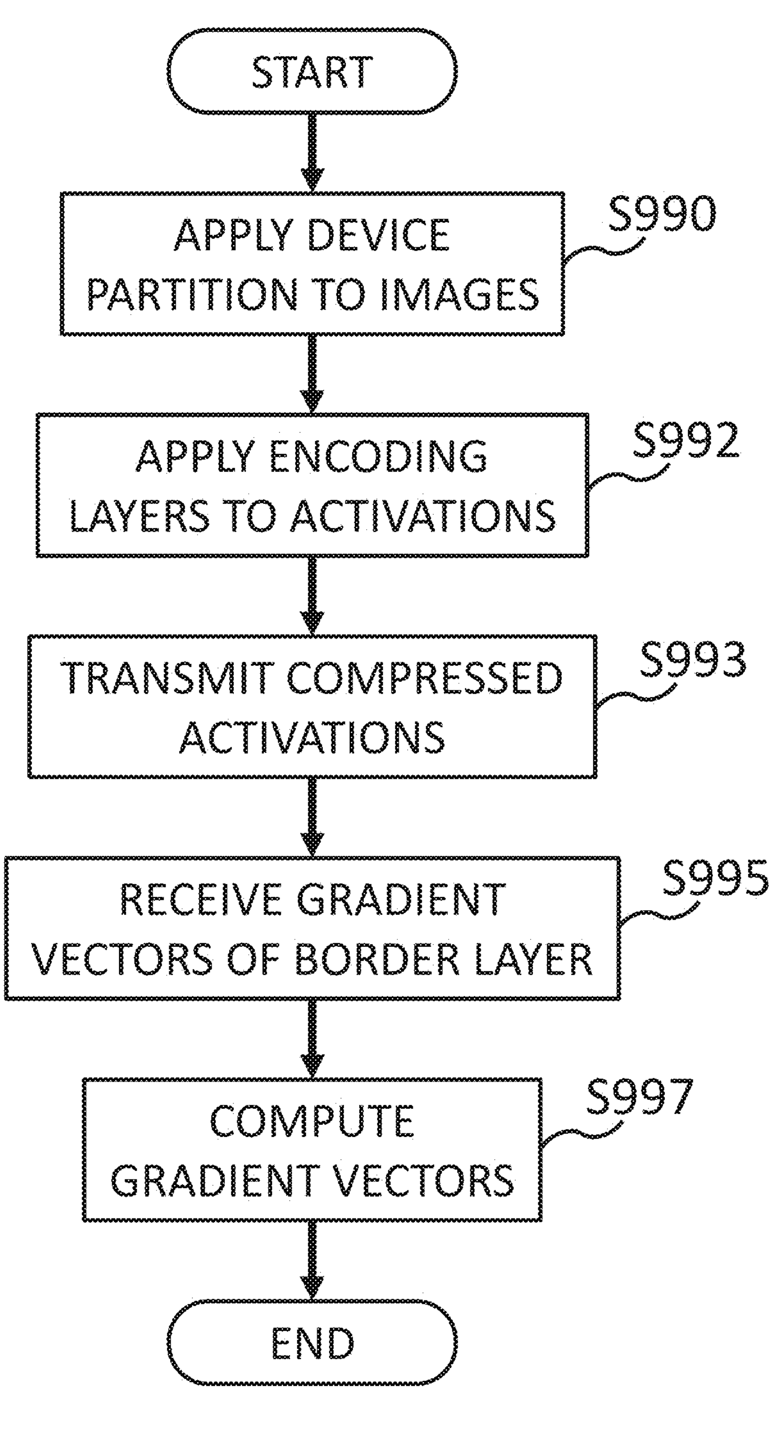
FIG. 9 is an operational flow for a batch of training in collaboration with a server, according to at least some embodiments of the subject disclosure.

FIG. 9 is an operational flow for a batch of training in collaboration with a server, according to at least some embodiments of the subject disclosure. The operational flow provides a method of training a neural network model by one computation device using a batch of data samples in collaboration with a server. In at least some embodiments, the operational flow is performed by each computation device among a plurality of computation devices. In at least some embodiments, the operational flow is performed in parallel by each computation device among the plurality of computation devices.

At S990, the computation device applies a device partition to current data samples. In at least some embodiments, the computation device applies the device partition to a set of data samples to obtain a set of activations.

At S992, the computation device applies encoding layers to the activations. In at least some embodiments, the computation device applies the plurality of encoding layers to the set of activations to obtain a set of compressed activations. In at least some embodiments, the computation device also quantizes the set of activations by decreasing the bit-width of each activation among the set of activations. In at least some embodiments, the computation device employs linear quantization on the activations output from encoding layers $$W_{E,k}^{*},$$

denoted as function Q(•). In at least some embodiments, the activations $$A_k^t$$

are quantized from 32 bits to 8 bits before transmission to the server. As a result, the size of the activations $$A_k^t$$

is further reduced by 75% using 8-bit linear quantization, resulting in compressed activations $$z_k^t.$$

At S993, the computation device transmits the compressed activations. In at least some embodiments, the computation device transmits, to the server, the set of compressed activations. In at least some embodiments, in transmitting the set of compressed activations, the computation device transmits a set of labels to the server.

At S995, the computation device receives gradient vectors of a bordering layer. In at least some embodiments, the computation device receives, from the server, a set of gradient vectors of a layer of the server partition bordering the device partition.

At S997, the computation device computes gradient vectors. In at least some embodiments, the computation device computes a set of gradient vectors for each layer of the device partition, based on the set of gradient vectors of the layer of the server partition bordering the device partition.

In at least some embodiments, switches determine whether computation devices need to upload the activations from the device partition and receive corresponding gradients from the server. In at least some embodiments, before generating and sending activations of the device partition to the server, an activation switch will determine whether transmission of the activations is required or whether the server will use a cached buffer of activations to train the server partition. If transmission of the activations is required, then the activations are compressed by the encoding layers. The compressed activations and labels of the corresponding samples are then transmitted to the server. On the server, the compressed activations are reconstructed by the decoding layers, and the reconstructed activations are used to train the server partition. After the gradients of the activations are computed, a gradient switch determines whether to transmit the gradients to the computation device for training of the device partition.

Figure 10:
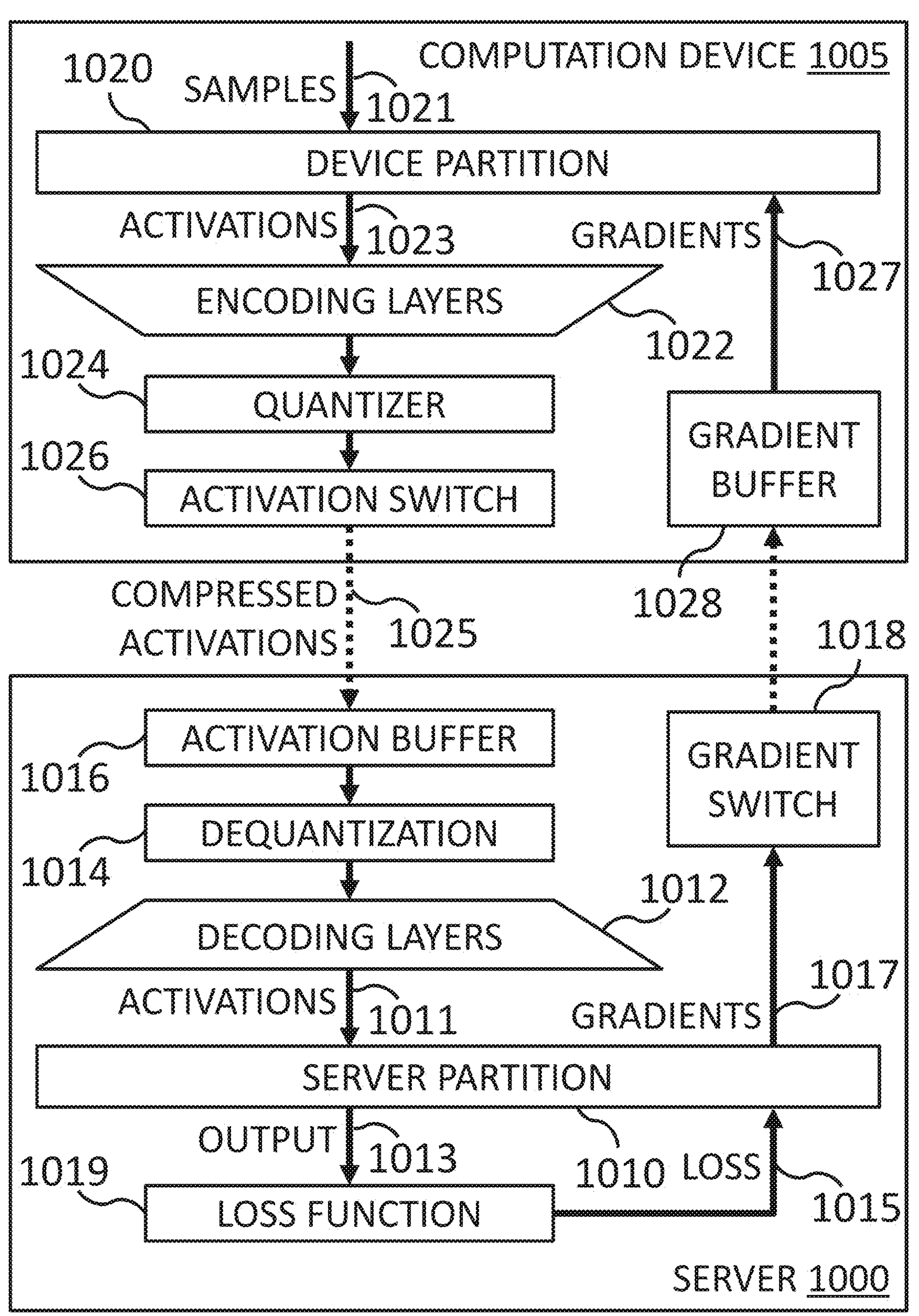
FIG. 10 is a schematic diagram of a server and a computation device for collaborative training with compressed transmissions and transfer learning, according to at least some embodiments of the subject disclosure.

FIG. 10 is a schematic diagram of a server and a computation device for collaborative training with compressed transmissions and transfer learning, according to at least some embodiments of the subject disclosure. Computation device 1005 includes a device partition 1020, a plurality of encoding layers 1022, a quantizer 1024, an activation switch 1026, and a gradient buffer 1028. Server 1000 includes an activation buffer, a dequantizer 1014, a plurality of decoding layers 1012, a server partition 1010, a loss function 1019, and a gradient switch 1018. Device partition 1020, samples 1021, encoding layers 1022, activations 1023, quantizer 1024, compressed activations 1025, gradients 1017, loss 1015, dequantizer 1014, output 1013, decoding layers 1012, activations 1011, server partition 1010, and loss function 1019 are substantially similar in structure and function to device partition 220, samples 221, encoding layers 222, activations 223, quantizer 224, compressed activations 225, gradients 217, loss 215, dequantizer 214, output 213, decoding layers 212, activations 211, server partition 210, and loss function 219 of FIG. 1, respectively, except where described differently.

In at least some embodiments, computation device 1005 is configured to utilize activation switch 1026 to periodically transmit compressed activations 1025 to server 1000 and withhold compressed activations from transmission. In at least some embodiments, activation switch 1026 determines to transmit compressed activations 1025 according to a predetermined schedule, such as once every five rounds, based on a difference in activations from a previous round, or based on the loss. In at least some embodiments, activation switch 1026 transmits compressed activations 1025 during each round for the first few rounds while the loss is greater and weight values are rapidly adjusting. In at least some embodiments, computation device 1005 is configured to utilize gradient buffer 1028 to re-use gradients 1027 from the buffer in response to server 1000 withholding transmission of gradients 1017 from being transmitted to computation device 1005. In at least some embodiments, gradient buffer 1028 is configured to update with new gradients each round that gradients are received. In at least some embodiments, computation device 1005 is configured to adjust gradients and update weight values using gradients of the previous round stored in gradient buffer 1028 in response to server 1000 withholding transmission of gradients.

In at least some embodiments, server 1000 is configured to utilize activation buffer 1016 to re-use gradients 1027 from the buffer in response to computation device 1005 withholding transmission of compressed activations 1025 from being transmitted to server 1000. In at least some embodiments, activation buffer 1016 is configured to update with new activations each round that activations are received. In at least some embodiments, server 1000 is configured to reconstruct activations of the previous round stored in activation buffer 1016 in response to computation device 1005 withholding transmission of activations. In at least some embodiments, server 1000 is configured to utilize gradient switch 1018 to periodically transmit gradients 1017 to computation device 1005 and withhold gradients from transmission. In at least some embodiments, gradient switch 1018 determines to transmit gradients 1017 according to a predetermined schedule, such as once every five rounds, based on a difference in activations from a previous round, or based on the loss. In at least some embodiments, gradient switch 1018 transmits gradients 1017 during each round for the first few rounds while the loss is greater and weight values are rapidly adjusting.

Figure 11:
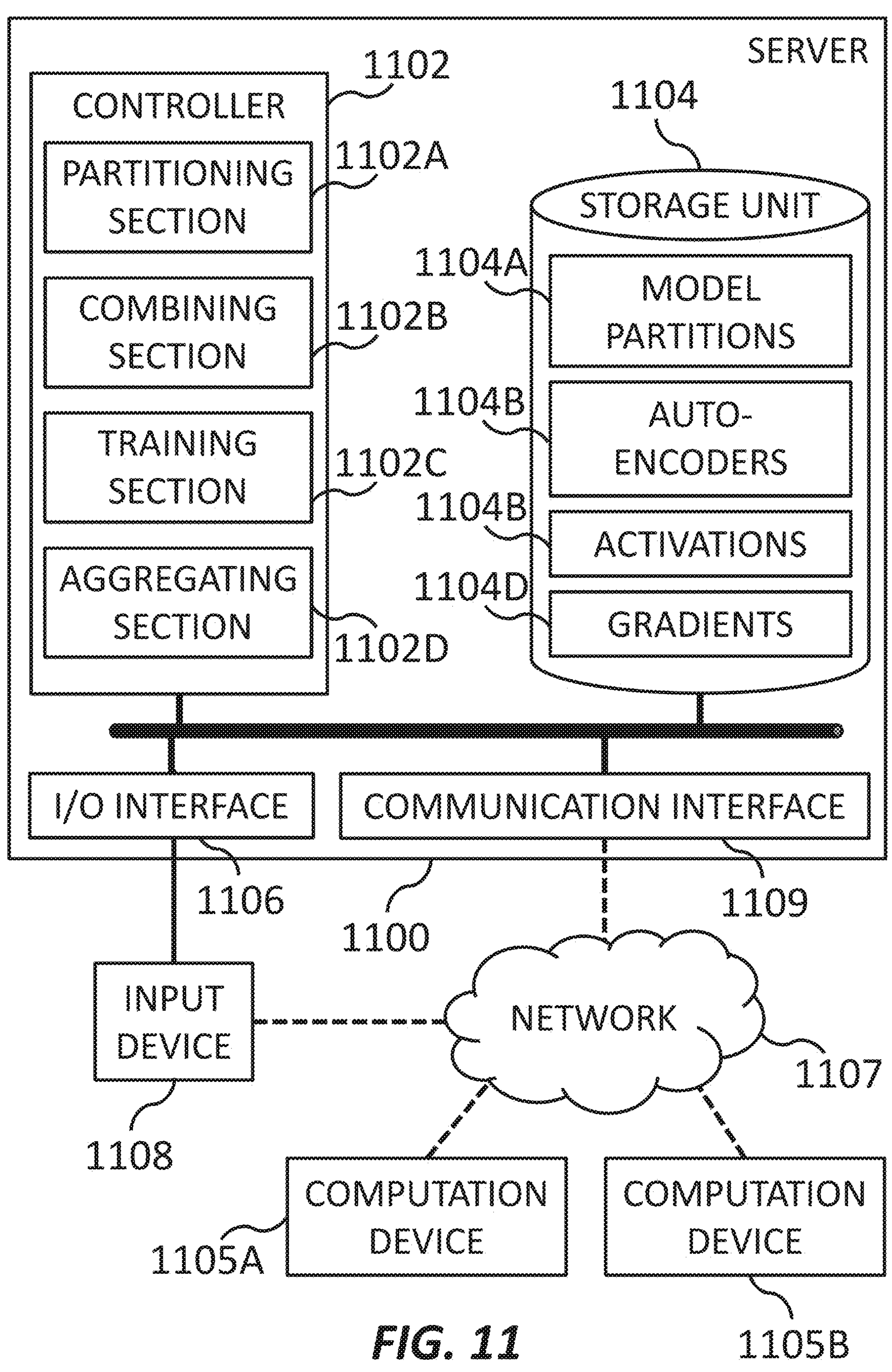
FIG. 11 is a block diagram of a hardware configuration for collaborative training with compressed transmissions, according to at least some embodiments of the subject disclosure.

FIG. 11 is a block diagram of a hardware configuration for collaborative training with compressed transmissions, according to at least some embodiments of the subject disclosure.

The exemplary hardware configuration includes server 1100, which interacts with input device 1108, and communicates with computation devices 1105A and 1105B through network 1107. In at least some embodiments, server 1100 is a computer or other computing device that receives input or commands from input device 1108. In at least some embodiments, server 1100 is integrated with input device 1108. In at least some embodiments, server 1100 is a computer system that executes computer-readable instructions to perform operations for collaborative training with compressed transmissions.

Server 1100 includes a controller 1102, a storage unit 1104, an input/output interface 1106, and a communication interface 1109. In at least some embodiments, controller 1102 includes a processor or programmable circuitry executing instructions to cause the processor or programmable circuitry to perform operations according to the instructions. In at least some embodiments, controller 1102 includes analog or digital programmable circuitry, or any combination thereof. In at least some embodiments, controller 1102 includes physically separated storage or circuitry that interacts through communication. In at least some embodiments, storage unit 1104 includes a non-volatile computer-readable medium capable of storing executable and non-executable data for access by controller 1102 during execution of the instructions. Communication interface 1109 transmits and receives data from network 1107. Input/output interface 1106 connects to various input and output units, such as input device 1108, via a parallel port, a serial port, a keyboard port, a mouse port, a monitor port, and the like to accept commands and present information. In some embodiments, storage unit 1104 is external from server 1100.

Controller 1102 includes partitioning section 1102A, combining section 1102B, training section 1102C, and aggregating section 1102D. Storage unit 1104 includes controllable parameters 890, readable metrics 892, and software controllers 894.

Partitioning section 1102A is the circuitry or instructions of controller 1102 configured to partition neural network models. In at least some embodiments, partitioning section 1102A is configured to partition a plurality of layers of a neural network model into a device partition and a server partition. In at least some embodiments, partitioning section 1102A records information in storage unit 1104, such as model partitions 1104A. In at least some embodiments, partitioning section 1102A includes sub-sections for performing additional functions, as described in the foregoing flow charts. In at least some embodiments, such sub-sections is referred to by a name associated with a corresponding function.

Combining section 1102B is the circuitry or instructions of controller 1102 configured to combine neural network layers. In at least some embodiments, combining section 1102B is configured to combine a plurality of encoding layers of an auto-encoder neural network with the device partition, and to combine the plurality of decoding layers of the auto-encoder neural network configured to aggregate the updated parameters of neural network model instances received from the plurality of computation devices to generate an updated neural network model. In at least some embodiments, aggregating section 1102D utilizes information from storage unit 1104, such as model partitions 1104A and gradients 1104D. In at least some embodiments, aggregating section 1102D includes sub-sections for performing additional functions, as described in the foregoing flow charts. In at least some embodiments, such sub-section is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. In at least some embodiments, the computer readable program instructions are executed entirely on the user’s computer, partly on the user’s computer, as a stand-alone software package, partly on the user’s computer and partly on a remote computer or entirely on the remote computer or server. In at least some embodiments, in the latter scenario, the remote computer is connected to the user’s computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by “prior to,” “before,” or the like and as long as the output from a previous process is not used in a later process. Even if the process flow is described using phrases such as “first” or “next” in the claims, embodiments, or diagrams, such a description does not necessarily mean that the processes must be performed in the described order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Accordingly, at least some embodiments of the subject disclosure include a non-transitory computer-readable medium including instructions executable by a processor to cause the processor to perform operations comprising: partitioning a plurality of layers of a neural network model into a device partition and a server partition; combining a plurality of encoding layers of an auto-encoder neural network with the device partition, wherein a largest encoding layer among the plurality of encoding layers is adjacent a layer of the device partition bordering the server partition; combining a plurality of decoding layers of the auto-encoder neural network with the server partition, wherein a largest decoding layer among the plurality of decoding layers is adjacent a layer of the server partition bordering the device partition; transmitting, to a computation device, the device partition combined with the plurality of encoding layers, training, collaboratively with the computation device through a network, the neural network model by receiving, from the computation device, a set of compressed activations output from the plurality of encoding layers, applying the plurality of decoding layers to the set of compressed activations to obtain a set of activations, applying the server partition to the set of activations to obtain a set of output instances, applying a loss function relating activations to output instances to each output instance among the current set of output instances to obtain a set of loss values, computing a set of gradient vectors for each layer of the server partition, including a set of gradient vectors of a layer bordering the device partition, based on the set of loss values, and transmitting, to the computation device, the set of gradient vectors of the layer bordering the device partition. In at least some embodiments, the operations further comprise training, collaboratively with the computation device through the network, the auto-encoder neural network before training the neural network model. In at least some embodiments, the operations further comprise: combining the plurality of decoding layers of the auto-encoder neural network with the device partition, wherein a smallest decoding layer among the plurality of decoding layers is adjacent a smallest layer among the plurality of encoding layers; transmitting, to a computation device, the device partition combined with the plurality of encoding layers and the plurality of decoding layers; and receiving, from the computation device, the plurality of decoding layers before combining the plurality of decoding layers with the server partition. In at least some embodiments, the training the neural network model further includes: dequantizing the set of compressed activations by increasing the bit-width of each compressed activation among the set of compressed activations. In at least some embodiments, the training the neural network model further includes: updating weight values of the server partition based on the set of gradient vectors for each layer of the server partition. In at least some embodiments, the operations further comprise: performing a plurality of iterations of the training; receiving the device partition from the computation device; and combining the device partition with the server partition to obtain an updated neural network model. In at least some embodiments, the receiving the set of compressed activations includes receiving a set of labels from the computation device.

At least some embodiments of the subject disclosure include a non-transitory computer-readable medium including instructions executable by a processor to cause the processor to perform operations comprising: receiving, from a server, a device partition of a neural network model combined with a plurality of encoding layers of an auto-encoder neural network, the neural network model including a plurality of layers partitioned into the device partition and a server partition, wherein a largest encoding layer among the plurality of encoding layers is adjacent a layer of the device partition bordering the server partition, training, collaboratively with the server through a network, the neural network model by applying the device partition to a set of data samples to obtain a set of activations, applying the plurality of encoding layers to the set of activations to obtain a set of compressed activations, transmitting, to the server, the set of compressed activations, receiving, from the server, a set of gradient vectors of a layer of the server partition bordering the device partition, and computing a set of gradient vectors for each layer of the device partition, based on the set of gradient vectors of the layer of the server partition bordering the device partition. In at least some embodiments, the operations further comprise: training, collaboratively with the server through the network, the auto-encoder neural network before training the neural network model. In at least some embodiments, the operations further comprise: receiving, from the server, the device partition combined with the plurality of encoding layers and a plurality of decoding layers of the auto-encoder neural network; training the auto-encoder neural network before training the neural network model; removing the plurality of decoding layers from the device partition and the plurality of encoding layers; and transmitting, to the server, the plurality of decoding layers. In at least some embodiments, the training the neural network model further includes: quantizing the set of activations by decreasing the bit-width of each activation among the set of activations. In at least some embodiments, the training the neural network model further includes: updating weight values of the device partition based on the set of gradient vectors for each layer of the device partition. In at least some embodiments, the operations further comprise: performing a plurality of iterations of the training; removing the plurality of encoding layers from the device partition; and transmitting the device partition to the server. In at least some embodiments, the transmitting the set of compressed activations includes transmitting a set of labels to the server.

At least some embodiments of the subject disclosure include a method comprising: partitioning a plurality of layers of a neural network model into a device partition and a server partition; combining a plurality of encoding layers of an auto-encoder neural network with the device partition, wherein a largest encoding layer among the plurality of encoding layers is adjacent a layer of the device partition bordering the server partition; combining a plurality of decoding layers of the auto-encoder neural network with the server partition, wherein a largest decoding layer among the plurality of decoding layers is adjacent a layer of the server partition bordering the device partition; transmitting, to a computation device, the device partition combined with the plurality of encoding layers, training, collaboratively with the computation device through a network, the neural network model by receiving, from the computation device, a set of compressed activations output from the plurality of encoding layers, applying the plurality of decoding layers to the set of compressed activations to obtain a set of activations, applying the server partition to the set of activations to obtain a set of output instances, applying a loss function relating activations to output instances to each output instance among the current set of output instances to obtain a set of loss values, computing a set of gradient vectors for each layer of the server partition, including a set of gradient vectors of a layer bordering the device partition, based on the set of loss values, and transmitting, to the computation device, the set of gradient vectors of the layer bordering the device partition. In at least some embodiments, the method further comprises training, collaboratively with the computation device through the network, the auto-encoder neural network before training the neural network model. In at least some embodiments, the method further comprises: combining the plurality of decoding layers of the auto-encoder neural network with the device partition, wherein a smallest decoding layer among the plurality of decoding layers is adjacent a smallest layer among the plurality of encoding layers; transmitting, to a computation device, the device partition combined with the plurality of encoding layers and the plurality of decoding layers; and receiving, from the computation device, the plurality of decoding layers before combining the plurality of decoding layers with the server partition. In at least some embodiments, the training the neural network model further includes: dequantizing the set of compressed activations by increasing the bit-width of each compressed activation among the set of compressed activations. In at least some embodiments, the training the neural network model further includes: updating weight values of the server partition based on the set of gradient vectors for each layer of the server partition. In at least some embodiments, the method further comprises: performing a plurality of iterations of the training; receiving the device partition from the computation device; and combining the device partition with the server partition to obtain an updated neural network model.

What is claimed is:

1. A non-transitory computer-readable medium including instructions executable by a server to cause the server to perform operations comprising:

partitioning a plurality of layers of a neural network model into a device partition to be trained by a computation device and a server partition to be trained by the server;

combining a plurality of encoding layers of an auto-encoder neural network with the device partition, wherein a largest encoding layer among the plurality of encoding layers is adjacent a layer of the device partition bordering the server partition;

combining a plurality of decoding layers of the auto-encoder neural network with the server partition, wherein a largest decoding layer among the plurality of decoding layers is adjacent a layer of the server partition bordering the device partition;

transmitting, to the computation device, the device partition combined with the plurality of encoding layers; and training, collaboratively with the computation device through a network, the neural network model by receiving, from the computation device after the computation device applies the device partition to a set of data samples to obtain a set of activations and applies the plurality of encoding layers to the set of activations to obtain a set of compressed activations, the set of compressed activations output from the plurality of encoding layers, applying the plurality of decoding layers to the set of compressed activations to obtain a set of activations, applying the server partition to the set of activations to obtain a set of output instances, applying a loss function relating activations to output instances to each output instance among the current set of output instances to obtain a set of loss values, computing a set of gradient vectors for each layer of the server partition, including a set of gradient vectors of a layer bordering the device partition, based on the set of loss values, updating weight values of the server partition based on the set of gradient vectors for each layer of the server partition, and transmitting, to the computation device, the set of gradient vectors of the layer bordering the device partition, wherein the computation device computes a set of gradient vectors for each layer of the device partition, based on the set of gradient vectors of the layer of the server partition bordering the device partition, and updates weight values of the device partition based on the set of gradient vectors for each layer of the device partition.

2. The computer-readable medium of claim 1, wherein the operations further comprise:

training, collaboratively with the computation device through the network, the auto-encoder neural network before training the neural network model.

3. The computer-readable medium of claim 1, wherein the operations further comprise:

combining the plurality of decoding layers of the auto-encoder neural network with the device partition, wherein a smallest decoding layer among the plurality of decoding layers is adjacent a smallest layer among the plurality of encoding layers;

transmitting, to a computation device, the device partition combined with the plurality of encoding layers and the plurality of decoding layers; and receiving, from the computation device, the plurality of decoding layers before combining the plurality of decoding layers with the server partition.

4. The computer-readable medium of claim 1, wherein the training the neural network model further includes:

dequantizing the set of compressed activations by increasing the bit-width of each compressed activation among the set of compressed activations.

5. The computer-readable medium of claim 1, wherein the operations further comprise:

performing a plurality of iterations of the training;

receiving the device partition from the computation device; and combining the device partition with the server partition to obtain an updated neural network model.

6. The computer-readable medium of claim 1, wherein the receiving the set of compressed activations includes receiving a set of labels from the computation device.

7. A non-transitory computer-readable medium including instructions executable by a computation device to cause the computation device to perform operations comprising:

receiving, from a server, a device partition of a neural network model combined with a plurality of encoding layers of an auto-encoder neural network, the neural network model including a plurality of layers partitioned into the device partition to be trained by the computation device and a server partition to be trained by the server, wherein a largest encoding layer among the plurality of encoding layers is adjacent a layer of the device partition bordering the server partition; and training, collaboratively with the server through a network, the neural network model by applying the device partition to a set of data samples to obtain a set of activations, applying the plurality of encoding layers to the set of activations to obtain a set of compressed activations, transmitting, to the server, the set of compressed activations, receiving, from the server after the server applies the plurality of decoding layers to the set of compressed activations to obtain a set of activations, applies the server partition to the set of activations to obtain a set of output instances, applies a loss function relating activations to output instances to each output instance among the current set of output instances to obtain a set of loss values, and computes, based on the set of loss values, a set of gradient vectors for each layer of the server partition, including a set of gradient vectors of a layer bordering the device partition, the set of gradient vectors of a layer of the server partition bordering the device partition, computing a set of gradient vectors for each layer of the device partition, based on the set of gradient vectors of the layer of the server partition bordering the device partition, and updating weight values of the device partition based on the set of gradient vectors for each layer of the device partition, wherein the server updates weight values of the server partition based on the set of gradient vectors for each layer of the server partition.

8. The computer-readable medium of claim 7, wherein the operations further comprise:

training, collaboratively with the server through the network, the auto-encoder neural network before training the neural network model.

9. The computer-readable medium of claim 7, wherein the operations further comprise:

receiving, from the server, the device partition combined with the plurality of encoding layers and a plurality of decoding layers of the auto-encoder neural network;

training the auto-encoder neural network before training the neural network model;

removing the plurality of decoding layers from the device partition and the plurality of encoding layers; and transmitting, to the server, the plurality of decoding layers.

10. The computer-readable medium of claim 7, wherein the training the neural network model further includes:

quantizing the set of activations by decreasing the bit-width of each activation among the set of activations.

11. The computer-readable medium of claim 7, wherein the operations further comprise:

performing a plurality of iterations of the training;

removing the plurality of encoding layers from the device partition; and transmitting the device partition to the server.

12. The computer-readable medium of claim 7, wherein the transmitting the set of compressed activations includes transmitting a set of labels to the server.

13. A method comprising:

partitioning a plurality of layers of a neural network model into a device partition to be trained by a computation device and a server partition to be trained by a server;

combining a plurality of encoding layers of an auto-encoder neural network with the device partition, wherein a largest encoding layer among the plurality of encoding layers is adjacent a layer of the device partition bordering the server partition;

combining a plurality of decoding layers of the auto-encoder neural network with the server partition, wherein a largest decoding layer among the plurality of decoding layers is adjacent a layer of the server partition bordering the device partition;

transmitting, to the computation device, the device partition combined with the plurality of encoding layers; and training, collaboratively with the computation device through a network, the neural network model by receiving, from the computation device after the computation device applies the device partition to a set of data samples to obtain a set of activations and applies the plurality of encoding layers to the set of activations to obtain a set of compressed activations, the set of compressed activations output from the plurality of encoding layers, applying the plurality of decoding layers to the set of compressed activations to obtain a set of activations, applying the server partition to the set of activations to obtain a set of output instances, applying a loss function relating activations to output instances to each output instance among the current set of output instances to obtain a set of loss values, computing a set of gradient vectors for each layer of the server partition, including a set of gradient vectors of a layer bordering the device partition, based on the set of loss values, updating weight values of the server partition based on the set of gradient vectors for each layer of the server partition, and transmitting, to the computation device, the set of gradient vectors of the layer bordering the device partition, wherein the computation device computes a set of gradient vectors for each layer of the device partition, based on the set of gradient vectors of the layer of the server partition bordering the device partition, and updates weight values of the device partition based on the set of gradient vectors for each layer of the device partition.

14. The method of claim 13, further comprising:

training, collaboratively with the computation device through the network, the auto-encoder neural network before training the neural network model.

15. The method of claim 13, further comprising:

combining the plurality of decoding layers of the auto-encoder neural network with the device partition, wherein a smallest decoding layer among the plurality of decoding layers is adjacent a smallest layer among the plurality of encoding layers;

transmitting, to a computation device, the device partition combined with the plurality of encoding layers and the plurality of decoding layers; and receiving, from the computation device, the plurality of decoding layers before combining the plurality of decoding layers with the server partition.

16. The method of claim 13, wherein the training the neural network model further includes:

dequantizing the set of compressed activations by increasing the bit-width of each compressed activation among the set of compressed activations.

17. The method of claim 13, further comprising:

performing a plurality of iterations of the training;

receiving the device partition from the computation device; and combining the device partition with the server partition to obtain an updated neural network model.

* * * * *